Nov. 6, 1945. S. F. CZERNER 2,388,391
GREASE GUN
Filed Oct. 9, 1944
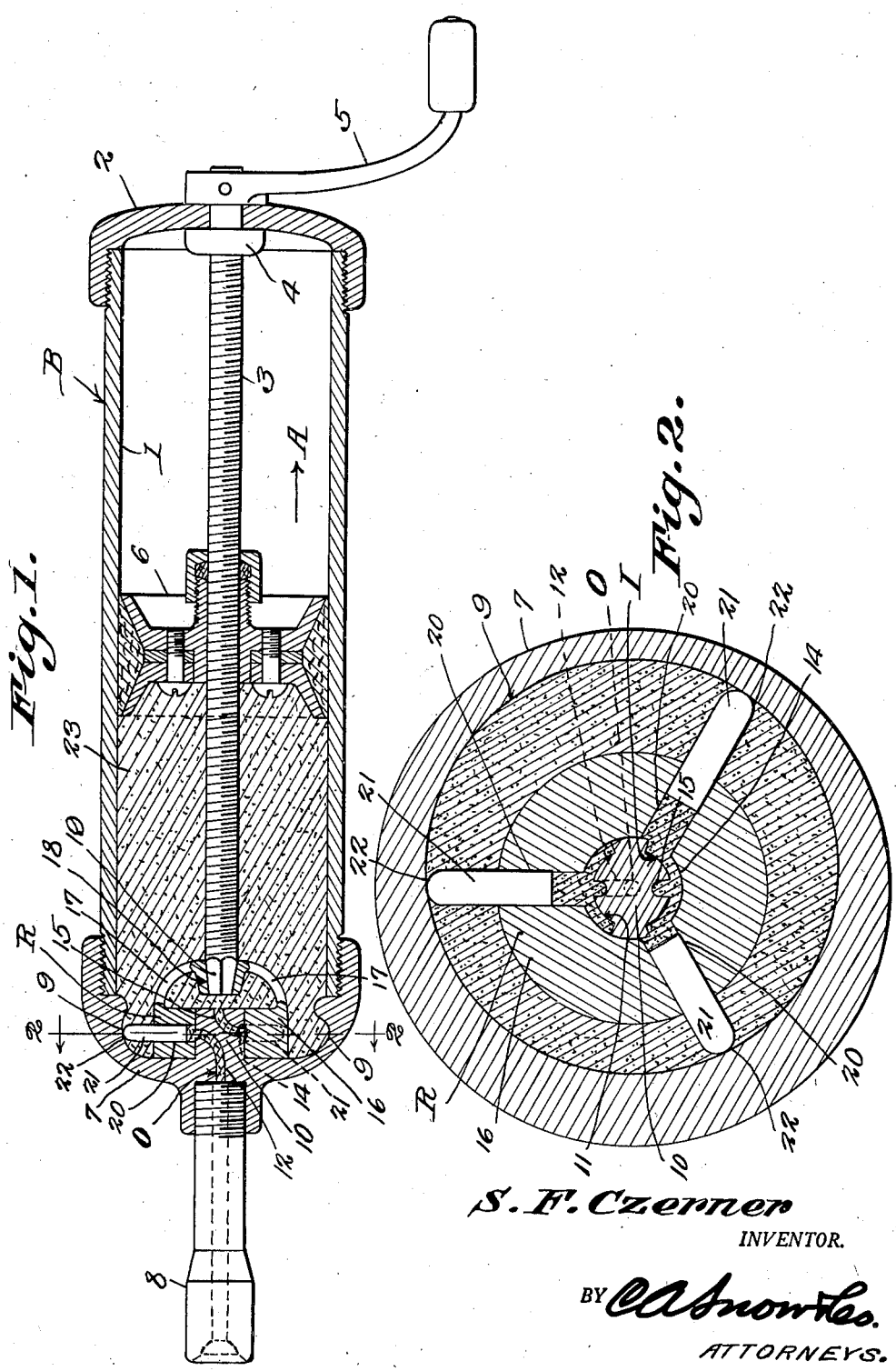
S. F. Czerner
INVENTOR.
BY CA Snow Leo
ATTORNEYS.

Patented Nov. 6, 1945

2,388,391

UNITED STATES PATENT OFFICE 2,388,391

GREASE GUN

Severin F. Czerner, Kings Mill, Tex.

Application October 9, 1944, Serial No. 557,854

3 Claims. (Cl. 222—256)

The device forming the subject matter of this application is a grease gun. The invention aims to provide novel means whereby in such a structure springs, valves and the like may be dispensed with, grease being ejected by the pulsations of a rotary pump structure, actuated by means which puts pressure on the grease to be ejected.

Within the scope of what is claimed, the structure described and shown may be changed, without departing from the spirit of the invention.

In the drawing:

Figure 1 shows, in longitudinal section, a grease gun constructed in accordance with the invention.

Figure 2 is a transverse section on line 2—2 of Figure 1.

The device forming the subject matter of this application includes a cylindrical barrel B, including a body 1, a rear cap 2 being detachably assembled with the body. A screw 3 is held for rotation, but against longitudinal movement, in the cap 2, as shown at 4. The screw 3 is rotated by means of an external crank 5, or otherwise. A piston 6 of any desired construction is mounted for reciprocation in the body 1. The screw 3 is threaded through the piston 6.

A forward cap 7 is detachably mounted on the body 1. A nozzle 8 is carried by the cap 7. The cap 7 is provided with an internal track 9. The internal track 9 is eccentric with respect to the longitudinal axis of the body 1. The cap 7 has an internal hub 10. The hub 10 is supplied with an outlet O. The outlet O comprises groove 11, extended circumferentially of the hub 10, and a duct 12 in the hub, leading to the nozzle 8.

The hub 10 is supplied with an inlet I. The inlet I comprises a circumferentially extended groove 14 in the hub 10, and a duct 15 in the hub, the duct communicating with the interior of the body 1. The grooves 11 and 14 are formed in the periphery of the hub 10, and the grooves are spaced apart, circumferentially of the hub.

A rotor R is mounted to rotate on the hub 10. The rotor R comprises an annular body 16 mounted immediately on the hub 10 and a spider 17 assembled with the hub. The spider 17 has a central seat 18. The screw 3 is provided with a polygonal tip 19, received against rotation in the seat 18.

Pumps are provided. There may be any desired number of these pumps. Each pump comprises a cylinder, in the form of a radial bore 20, formed in the body 16 of the rotor R. Pistons 21 are mounted to reciprocate in the cylinder bores 20. Pistons 21 have convex ends 22, engaging the eccentric track 9 of cap 7.

Lubricant 23 is located in barrel B, between the piston or follower 6 and the cap 7. When the screw 3 is rotated by means of the crank 5, the follower 6 is advanced and pressure is put on the lubricant 23. If excessive pressure thus is put on the lubricant 23, the follower 6 will rotate counter-clockwise and tend to travel backwardly in the direction of the arrow "A" on the threads of the screw 3.

The lubricant 23, under pressure, passes through the duct 15, into the groove 14. The cylinders 20, in communication with the duct 15, receive lubricant under pressure and the corresponding pistons 21 are forced outwardly into engagement with the eccentric track 9 on the cap 7.

The rotor R is rotated by means of the screw 3. As each cylinder 20 comes into communication with the groove 11 of the outlet O, the lubricant is discharged through the duct 12, into nozzle 8. The discharge through the duct 12 is effected because the corresponding piston 21 is forced inwardly by the appropriate portions of the eccentric cam track 9. The outlet groove 11 affords a time interval for the discharge of lubricant. The groove 14 affords a time interval for the inlet of lubricant.

The device forming the subject matter of this application eliminates the conventional levers, exposed plungers, pull-out rods, priming springs, plunger springs, valve springs and valves. Air pockets will not interfere with the operation of the device, since the pumping mechanism will be constantly primed through the instrumentality of the follower 6, which is operated by the screw 3.

Dirt will not accumulate on the pistons 21, since they are enclosed. Grease which may leak past the pistons 21 will be received within the body 1 of the barrel B. The pistons 21 do not operate unless primed by the follower 6. Consequently, the formation of air pockets in the lubricant is avoided to a maximum extent.

The grease gun may be charged by removing the cap 7, then inserting the open end of the barrel B into an external mass of lubricant and reversing the direction of rotation of the screw 3. A simple and long-lived structure is afforded. The working parts are readily accessible for repair or renewal. The device is facile in operation and is actuated without difficulty.

What is claimed:

1. A grease gun comprising a barrel provided at one end with an internal track eccentric with respect to the longitudinal axis of the barrel, the barrel being provided at said end with an internal hub concentric with respect to the longitudinal axis of the barrel, the hub having a discharge outlet which opens through the periphery of the hub, the hub having an inlet which opens at one end through the periphery of the hub and communicates at its opposite end with the interior of the barrel, a rotor journaled on the hub and having cylinders which communicate first with the inlet and then with the outlet as the rotor is rotated, pistons mounted to reciprocate in the cylinders and engaged at their outer ends with the track, to secure inward movement of the pistons while the cylinders are in communication with the outlet, and a combined means carried by the barrel for rotating the rotor, to bring the cylinders first into communication with the inlet and then into communication with the outlet, and for putting pressure on the contents of the barrel to charge the cylinders while they are in communication with the inlet.

2. The grease gun of claim 1, wherein the combined means is a screw held in the barrel for rotation, but against longitudinal movement, means for connecting the screw to the rotor to secure rotation thereof, and a piston slidable in the barrel and threaded on the screw.

3. The grease gun of claim 1, wherein the inlet comprises a circumferentially extended groove in the periphery of the hub, and a duct in the hub and communicating with the interior of the barrel and with the groove, the outlet comprising a circumferentially extended groove in the periphery of the hub, and a duct in the hub and communicating with the groove.

SEVERIN F. CZERNER.